Figure 1:
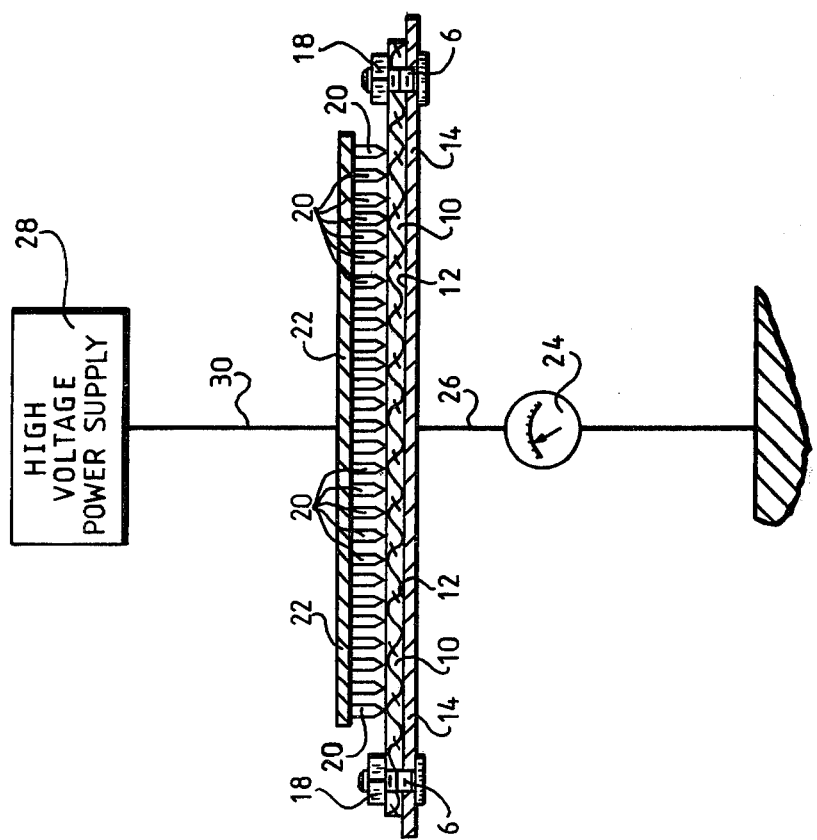

United States Patent [19]

Stern

[11] 4,308,223
[45] Dec. 29, 1981

[54] METHOD FOR PRODUCING ELECTRET FIBERS FOR ENHANCEMENT OF SUBMICRON AEROSOL FILTRATION

[75] Inventor: Sidney C. Stern, Framingham, Mass.

[73] Assignee: Albany International Corp., Menands, N.Y.

[21] Appl. No.: 133,528

[22] Filed: Mar. 24, 1980

[51] Int. Cl.[3] .......... B29H 7/20

[52] U.S. Cl. .......... 264/22; 264/26

[58] Field of Search .......... 264/24, 26, 22, 108; 361/230

[56] References Cited

U.S. PATENT DOCUMENTS

| | | | |
|---|---|---|---|
| 2,385,873 | 10/1945 | Melton | 264/24 |
| 2,476,282 | 7/1949 | Castellan | 264/26 |
| 2,476,283 | 7/1949 | Castellan | 264/26 |
| 2,740,184 | 4/1956 | Thomas | 361/233 |
| 2,820,716 | 1/1958 | Harmon et al. | 264/24 |
| 2,920,172 | 1/1960 | Stallard | 264/26 |
| 2,920,679 | 1/1960 | Sittel | 264/24 |
| 2,998,051 | 8/1961 | Sittel | 264/24 |
| 3,003,304 | 10/1961 | Rasmussen | 264/22 |
| 3,414,444 | 12/1968 | Bobkowicz et al. | 264/24 |
| 3,483,374 | 12/1969 | Erben | 361/213 |
| 3,571,679 | 3/1971 | Van Turnhout | 361/233 |
| 3,708,561 | 1/1973 | Horimoto et al. | 264/22 |
| 3,900,538 | 8/1975 | Kawakami et al. | 264/80 |
| 3,924,324 | 12/1975 | Kodera | 361/233 |
| 3,998,916 | 12/1976 | Van Turnhout | 264/22 |
| 4,086,499 | 4/1978 | Mishra | 361/233 |
| 4,147,745 | 4/1979 | Sano et al. | 264/83 |
| 4,178,157 | 12/1979 | Van Turnhout et al. | 264/22 |
| 4,215,682 | 8/1980 | Kubik et al. | 264/22 |

FOREIGN PATENT DOCUMENTS

| | | | |
|---|---|---|---|
| 51-20718 | 6/1976 | Japan | 361/233 |

*Primary Examiner*—Jay H. Woo
*Attorney, Agent, or Firm*—Kane, Dalsimer, Kane, Sullivan and Kurucz

[57] ABSTRACT

A method is provided for imparting a permanent electrostatic charge to polymeric fibers. Ions are implanted into the fibers in the presence of a strong electric field while the temperature is maintained above the glass transition temperature but below the melting temperature of the fibers. The method is particularly adapted for ion implantation into a fibrous filter mat. Carbonium ions formed by a corona discharge may be implanted into deep sites within the fibers.

19 Claims, 1 Drawing Figure

METHOD FOR PRODUCING ELECTRET FIBERS FOR ENHANCEMENT OF SUBMICRON AEROSOL FILTRATION

BACKGROUND OF THE INVENTION

The field of the invention relates to methods for making electret fibers, and particularly for making electret filter mats for enhancing the removal of particulate matter from gas streams.

Electrostatic forces have been used for many years to enhance the particulate collection efficiency of fibrous filter mats by using a strong electric field oriented in the direction of air flow through a filter structure. A strong electric field can be established, in the direction of air flow through a filter structure by using conductive filaments that are connected to an external high voltage power supply.

One method for creating an electric field in the inner structure of a fibrous filter mat is to coat the fibers with particles of zinc colophony resin. The resin is initially dissolved in a solvent and the fibrous mat is saturated with the solvent plus resin. After evaporation of the solvent, the fibrous structure is mechanically needled to fracture the zinc resin crystals. The frictional effect of particle to particle attrition and/or crystal fracture along internal planes is sufficient to cause the particles to acquire a saturated positive or negative charge. A strong electric field is formed about each particle and the filter structure can remain charged for years at low humidities. Retention will be for a long period of time because the colophony resin is an excellent insulator, having an electrical resistance of $10^{21}$ ohms/square. Another reason for longevity is that the concentration of charged ions or molecules in the atmosphere is relatively low and not adequate for particle neutralization. However, at relative humidities of 50% or greater, the resin will absorb moisture, the material will become conductive, and the field effect will be negated.

An electric field can also be produced in a filter structure when permanent electrostatic charges exist in polymeric fibers that constitute the filter. Such bound permanent electrostatic charge are called "electrets". In a paper by Petryanov et al entitled "FP Fibrous Filtering Materials," Znaniye Press, Moscow (1968), data are given on the enhancement of aerosol collection by electrostatically charged polymeric fibrous filter mats. The authors cautioned that at high humidities, the electret enhancement effect was nonexistent due to charge dissipation. No description is given of the means to impart a permanent electrostatic charge to the fibrous filter.

On the other hand, following the teachings of U.S. Pat. No. 3,998,916, one can make an electret fibrous filter by initial corona charging of a thin polypropylene film, fibrillating the film and using the resulting fibers to construct a nonwoven felted structure. The teachings of this patent are examples of the prior art as it pertains to making a fibrous filter mat starting with a polymeric film structure. However, no technique or technology existed for making electret filter mats starting with an existing nonwoven needled felt.

SUMMARY OF THE INVENTION

Permanent polarization of dielectric materials can be accomplished by one or a combination of the following mechanisms:

1. the alignment of the molecules within a polymer in the presence of an electric field in such a way that dipoles are formed that are oriented in an array that resembles the alignment of magnetic North and South poles in an electromagnetic field;

2. the deposition or implantation of electrostatic charges in the polymeric materials, from an external source such as a corona discharge.

The method according to the invention essentially utilizes a combination of both mechanisms and comprises implanting stable ions, in the presence of a strong electric field, into the fibers of a polymeric (e.g. polypropylene) filter structure which is at a temperature above the glass transition temperature but below the melt temperature. This may be accomplished by means of a corona discharge from multiple sharp points that are at a high potential.

BRIEF DESCRIPTION OF THE DRAWING

The drawing shows an assembly adapted for performing the method according to the invention.

DESCRIPTION OF THE INVENTION

A polypropylene needled felt is a suitable material for use as a filter medium, and permanent electrostatic charges can be provided therein in accordance with the invention. Electret fibers within filters have been found to enhance submicron aerosol filtration.

Polypropylene felts of appropriate size are scoured in a distilled water solution of tetra sodium pyrophosphate, rinsed with distilled water, and oven dried at 100° C.

By way of exchange felts meeting the following specifications have been successfully utilized:

| | | |
|---|---|---|
| Fiber composition | - | 100%, 3 denier polypropylene |
| Weight | - | 12 oz./yd$^2$ |
| Thickness | - | 75 mils |
| Air Permeability | - | $\frac{20\ ft^3}{min\ ft^2}$ at a pressure drop of 0.5 inches of water |

The surface conductivity of each side of the scoured felts can be determined using the procedure given in AATCC Method 76-1978. (The AATCC is the American Association of Textile Chemists and Colorers). Materials having a resistivity of $\geqq 10^{14}$ ohms/square were selected for subsequent procedures.

The apparatus used for creating electret fibers is shown in the drawing. The scoured felt 10 is placed in physical contact with a dielectric film 12 which in turn is in direct contact with a metallic base plate 14. The film 12 may be Mylar, a commercially available polyester film or a fluorcarbon Teflon film. Nylon screws 16 and polycarbonate rings 18 secure the felt and film to the plate 14. The screws extend through the felt, film, and plate, respectively.

The secured assembly is then placed in an oven with the plane of the felt parallel to a multipoint corona electrode. The points 20 are in electrical continuum with a second metallic base plate 22. A high number of discharge points per unit area is provided, and they are continuous across the second plate 22. The points may be positioned a few millimeters from the surface of the felt. Alternatively, they may be inserted within the felt, but not in direct contact with the dielectric backing.

The first plate 14 is connected to an earth ground through a microammeter 24. A shielded cable 26 is utilized for this purpose. The second plate is connected to a high voltage power supply 28 by a high voltage electrical cable 30.

The oven temperature is kept between the glass transition and melt temperatures of the needled felt 10. Using the felt described above, the temperature may be maintained at 120° C. for fifteen minutes. Carbon dioxide may be introduced into the oven to increase the concentration of carbon dioxide in the vicinity of the electrode points. In the presence of a corona discharge, stable $CO_3^=$ ions are formed that can be implanted into deep sites in the polymeric material.

High voltage is then applied to the corona points 20 until low current ($10^{-7}$–$10^{-8}$ amps) is detected by the microammeter. The felt is exposed to the electric field and corona charging for about three minutes.

After the needled felts 10 are removed from their holders, the surface charge is measured with a noncontacting electrostatic voltmeter. Additional tests are conducted on the treated felts stored in a dessicator or exposed to room air at ambient temperatures of 72° F. and relative humidities between 40–70%. Periodically the surface changes of these felts were measured with the electrometer device. These charges were found to be maintained for considerable periods of time.

Charged filters were also tested to determine particulate penetration of the felts, using a protocol for face respirator filters provided by the National Institute of Safety and Health. Control samples were tested using the identical protocol. The results are indicated in the tables below.

TABLE I untreated sample
Polypropylene Needled Felts Controls
Penetration in mgs for Controls

| Control No. | Penetration mg. |
|---|---|
| 1 | 18.3 |
| 2 | 10.3 |
| 3 | 8.7 |
| 4 | 10.7 |

TABLE II treated samples
Polypropylene Needled Felts
Subjected to Ion Implantation and A Strong Electric Field

| Sample No. | Penetration mg |
|---|---|
| 2 | 1.3 |
| 18 | 1.5 |
| 17 | 1.7 |
| 12 | 1.7 |
| 34 | 2.3 |
| 8 | 2.6 |
| 6. | 2.6 |
| 20 | 2.9 |
| 4 | 3.3 |
| 13 | 4.0 |
| 27 | 4.1 |
| 26 | 4.6 |
| 35 | 5.7 |
| 36 | 7.0 |

It can be seen from the above tables that with the exception of Sample #36, there is a significant decrease in aerosol penetration as a result of ion implantation and exposure to an electric field.

What is claimed is:

1. A method for imparting a permanent electrostatic charge to a polymeric fibrous filter mat, comprising the steps of:

providing a first metallic base plate having a dielectric film thereon, said first plate being connected to ground;

placing said polymeric fibrous filter mat in physical contact with said dielectric film;

providing a second metallic base plate having a high density of corona discharge points extending therefrom, said second metallic base plate being connected to a high voltage source, and said corona discharge points being in close proximity to said filter mat;

elevating the temperature of said plates and said filter mat to between the glass transition and melt temperatures of said polymeric filter mat; and applying a high voltage to said corona points to expose said filter mat to corona charging and an electric field, whereby the molecules within said polymeric fibrous filter mat become aligned so as to form dipoles and electrostatic charges are implanted within said filter mat due to said corona charging.

2. A method as described in claim 1 wherein said filter mat is made from polypropylene.

3. A method as described in claim 1 further including the step of providing an increased concentration of carbon dioxide near said polymeric fibrous filter mat in the presence of corona discharge such that stable $CO_3^=$ ions are formed and are implanted into deep sites in said polymeric filter mat.

4. A method as described in claim 1 further including the step of securing said filter mat and said dielectric film to said first base plate by means of plastic rings upon said mat and nylon screws extending through said rings, mat, film and said first base plate.

5. A method as described in claim 1 including inserting said corona discharge points into said filter mat without contacting said dielectric film.

6. A method as described in claim 1 wherein said dielectric film is a polyester or flurocarbon film.

7. A method as described in claim 1 including scouring said polymeric fibrous filter mat in a distilled water solution of tetra sodium pyrophosphate, rinsing with distilled water, and oven drying said mat prior to placing it in physical contact with said dielectric film.

8. A method as described in claim 1 wherein said mat is exposed to the electric field and corona discharge for about three minutes.

9. A method as described in claim 1 wherein said first base plate is connected to ground through a microammeter, and applying high voltage to said corona discharge points until low current flow occurs in said microammeter.

10. A method as described in claim 1 wherein said filter mat is a non-woven needled felt.

11. A method for imparting a permanent electrostatic charge to polymeric fibers, comprising the steps of implanting stable ions into said fibers in the presence of a strong electric field while said fibers are at a temperature above the glass transition temperature but below their melting temperature, whereby dipoles are formed in said fibers which are oriented in an array resembling the alignment of magnetic North and South poles in an electromagnetic field, and electrostatic charges are implanted in said fibers.

12. A method as described in claim 11 wherein said fibers are in the form of a fibrous filter mat.

13. A method as described in claims 11 or 12 wherein said ions are implanted within said fibers by means of a corona discharge from multiple sharp points that are at a high potential.

14. A method as described in claims 11 or 12 wherein said fibers are polypropylene.

15. A method as described in claim 13 further including the step of providing an increased concentration of carbon dioxide near said polymeric fibers in the presence of corona discharge such that stable $CO_3^=$ ions are formed and are implanted into deep sites within the fibers.

16. A method as described in claim 15 wherein said fibers are exposed to the electric field and corona discharge for about three minutes.

17. A method as described in claim 9 wherein said low current flow is between $10^{-7}$ and $10^{-8}$ amps.

18. A method as described in claim 13 wherein high voltage is applied to the multiple sharp points until corona current flow to ground reaches a predetermined level.

19. A method as described in claim 18 wherein said predetermined level is between $10^{-7}$ and $10^{-8}$ amps.

* * * * *